United States Patent [19]

Peterson

[11] Patent Number: 4,544,231
[45] Date of Patent: Oct. 1, 1985

[54] METHOD OF JOINING PLASTIC OPTICAL FIBERS AND CONNECTIONS OBTAINED

[75] Inventor: John I. Peterson, Falls Church, Va.

[73] Assignee: The United States of America as represented by the Secretary of the Department of Health & Human Services, Washington, D.C.

[21] Appl. No.: 509,819

[22] Filed: Jun. 29, 1983

[51] Int. Cl.⁴ .............................................. G02B 5/14
[52] U.S. Cl. .............................. 350/96.15; 350/96.20; 350/320
[58] Field of Search ............... 350/96.15, 96.20, 96.21, 350/320

[56] References Cited

U.S. PATENT DOCUMENTS

| | | | |
|---|---|---|---|
| 3,579,316 | 5/1971 | Dyott et al. | 350/96.15 X |
| 3,928,102 | 12/1975 | Rowe et al. | 350/96.15 X |
| 4,237,474 | 12/1980 | Ladany | 350/96.20 X |
| 4,269,648 | 5/1981 | Dakss et al. | 350/96.18 X |
| 4,423,923 | 1/1984 | Frazier et al. | 350/96.15 |

Primary Examiner—William L. Sikes
Assistant Examiner—Akm E. Ullah
Attorney, Agent, or Firm—Browdy and Neimark

[57] ABSTRACT

Plastic optical fibers are joined by heat-flaring their ends in a first tubular sleeve and joining the flared ends within a tubular sleeve of about the same size with a U.V.-curable optical cement. The fibers may be joined side-by-side or end-to-end. Different diameter tubes may also be joined together by the method of the present invention.

16 Claims, 7 Drawing Figures

FIG.1
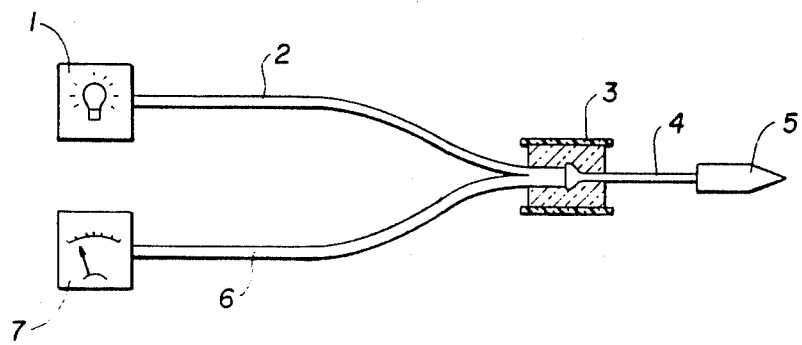
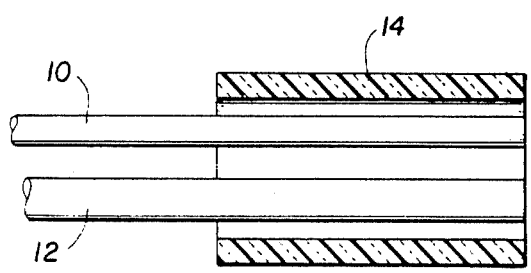
FIG.2
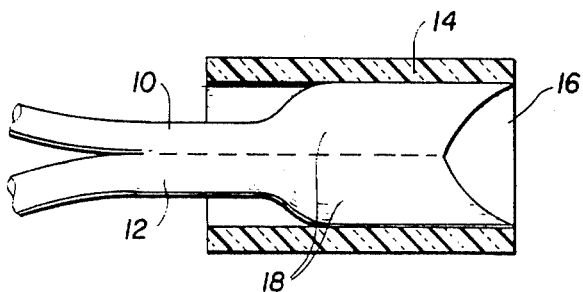
FIG.3
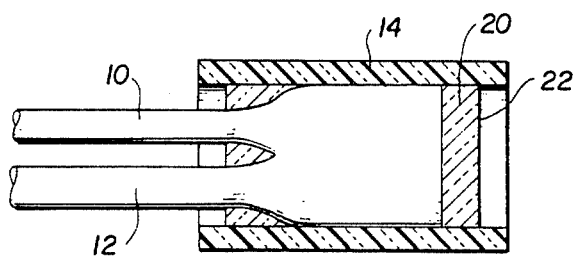
FIG.4

FIG.5
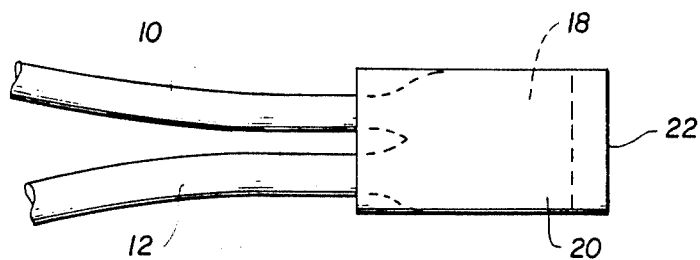
FIG.6
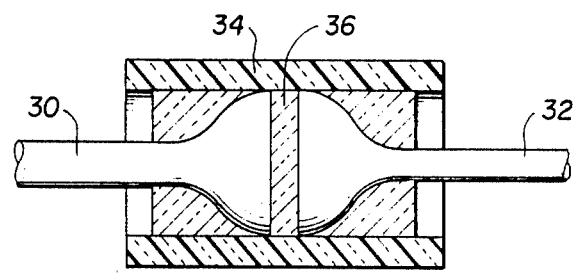
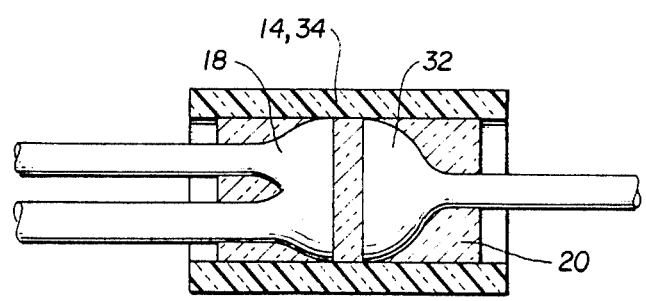
FIG.7

METHOD OF JOINING PLASTIC OPTICAL FIBERS AND CONNECTIONS OBTAINED

FIELD OF THE INVENTION

This invention relates to connections between plastic optical fibers and methods for joining the fibers, and more particularly to a method of fusing fiber ends to form connections between two or more optical fibers in side-by-side and/or abutting relationship.

BACKGROUND OF THE INVENTION

In recent years, plastic optical fibers have enjoyed great success in applications which demand miniaturization of components and reduction of cost. One area of increased utilization is in sensors and instrumentation for medical applications, as for example in PO₂ and pH probes, where mechanical flexibility, durability and low cost are critical factors.

In designing such fiber optic sensors and related instrumentation, it has become extremely desirable to have a method of directly joining plastic optical fibers. For example, in typical PO₂ probes, generally the terminal ends of two fibers are positioned in side-by-side parallel alignment so that excitation light enters the probe from one fiber and luminescent light from the probe passes into the other fiber. Improved performance, optically and mechanically, however, could be achieved if the fiber ends were physically joined together rather than merely being held side-by-side. Further in conventional PO₂ and pH probes, where two wavelengths of light are required for measurement, a bifurcated or joined fiber design would permit the sensor to be carried on only a single fiber. Thus, an even smaller sensor could be achieved than that which is presently used.

At present, various methods are known for joining or bonding optical fibers, and may be categorized as end-to-end connections and as side-by-side connections.

End-to-end connections are typified by the following U.S. Patents: BUHITE et al (U.S. Pat. No. 3,810,802) which discloses a method of joining together single optical fibers collinearly aligned within a sleeve by filling the space remaining in the sleeve interior at the junction of the fibers with a low melting point transparent thermoplastic and then applying heat to melt the thermoplastic; ROWE et al (U.S. Pat. No. 3,928,102) which discloses a method of joining two optical fibers end-to-end using heat and/or an adhesive where the fibers are supported, for alignment, by surface tension of a liquid; MATSUNO (U.S. Pat. No. 4,196,965) which teaches connecting a pair of optical fibers end-to-end by stripping away the plastic cladding surrounding the fiber ends, aligning the ends, heat melting the abutting ends and then covering the ends within a laminated sleeve; and KERSTEN (U.S. Pat. No. 4,220,619) which discloses the use of a heat-shrinkable tube to secure first and second groups of fibers end-to-end.

Side-by-side connections are typified by HUDSON (U.S. Pat. No. 4,083,625) and LEMESLE et al (U.S. Pat. No. 4,256,365) both of which disclose a method of joining a pair of fibers in which adjacent cladding of the side-by-side fibers is fused. HUDSON further discloses fusing the end faces of the joined pair to a single fiber. KAWASAKI et al (U.S. Pat. No. 4,291,940) teaches connecting a pair of fibers positioned side-by-side by fusing the fibers along a small portion of their length.

None of the above references disclose or teach side-by-side connection of two or more plastic optical fibers by fusion of the fiber ends. The methods previously described for glass fibers are not suitable or applicable to plastic fiber joining. Such a procedure, heretofore has not been practiced or effected, and heretofore the notion of joining fiber ends side-by-side by fusion has been shelved by anticipation of exceedingly high costs in designing and engineering specialized fixtures which might be required to hold the fibers ends in alignment prior to effecting a connection by heat-melting or fusing of the fibers themselves.

There is therefore a clearly defined need for a method of joining two or more optical fibers side-by-side which overcomes the above deficiencies.

OBJECTS OF THE INVENTION

It is therefore an object of the present invention to provide a method of joining two or more optical fibers side-by-side which overcomes the deficiencies and disadvantages of previously known methods.

Another object of the present invention is to provide an improved method of joining the ends of plastic optical fibers by fusing the fiber material.

Still another object is to provide an improved method of terminating at least two optical fibers at their ends for use in a probe or sensor.

Yet another object is to provide an improved method of making a connection between optical in which two or more plastic fibers are fused together side-by-side and then fused, as a unit, to a single fiber.

Another object is to provide an improved method of making bifurcated optical fiber joints which can be easily incorporated into probes and sensors.

Another object is to provide an improved method of fusing aligned ends of optical fibers of the same or different diameter without the requirement of specialized fixtures or positioning apparatus.

Still another object is to provide a fused connection between two or more plastic optical fibers which minimizes signal artifacts and facilitates optimum output signal strength.

SUMMARY OF THE INVENTION

These and other object of the invention are attained by the provision of a method of joining plastic optical fibers which involves positioning two or more fibers adjacent to, and parallel with, one another with their ends substantially aligned, inserting the fibers into a tube, fusing the ends of the fibers to fill the tube, squaring off the tube and fused fiber ends, coating the fiber ends with UV-curing optical cement, and curing the cement. Upon completion of these method steps, the tubing may be removed prior to joining the fused ends end-to-end to one or more other fibers by a method similar to that described above. Variation in the method disclosed facilitates an end-to-end connection of two fibers of different diameter.

BRIEF DESCRIPTION OF THE DRAWINGS

Further objects and advantages of the invention will become apparent from the following description and claims, and from the accompanying drawings wherein:

FIG. 1 is a simplified representation of a fiber optic probe construction in which the fiber connection of the present invention may be used;

FIG. 2 depicts a first phase of a first method of the present invention;

FIG. 3 depicts a first dual fiber construction made according to a first method of the present invention;

FIG. 4 shows a second dual fiber construction made according to a first method of the present invention;

FIG. 5 depicts a third dual fiber construction made according to a first method of the present invention;

FIG. 6 illustrates another embodiment of an optical fiber connection made in accordance with a second method of the present invention; and FIG. 7 shows a third embodiment of an optical fiber connection made according to a third method of the present invention.

DETAILED DESCRIPTION OF THE PRESENT INVENTION

Referring now to FIG. 1, a simplified fiber optic probe construction in which the connection of the present invention may be used includes two fibers 2, 6 which are joined at 3 to a single fiber 4 leading to sensor 5. Light originating from a suitable source 1, is transmitted along fiber 2, through joint 3, along single fiber 4 and into sensor 5. Reflected or otherwise returning light from sensor 5 passes back through fiber 4, is split at connection 3, and thereafter only a portion passes through fiber 6 to instrument 7, where an appropriate measurement is effected.

Joint or connection 3, to be optically and mechanically valuable, must be substantially free of signal artifacts, enable optimum signal strength from sensor 5, and be sturdy, durable and maintain integrity of the connection whether the fibers are of the same or different diameter, and are joined end-to-end or side-by-side. Constructing such a connection is accomplished in the following manner: (a) As shown in FIG. 2, two fibers 10 and 12 are inserted, side-by-side, into a short length of tubing 14 preferably made of PTFE and preferably being clear. The two fibers are shown only for purposes of simplified illustration-more than two fibers could be joined with no adjustment needed in the steps performed or in the order of their being performed. The tubing is positioned adjacent the ends of the fibers, and the fibers (and tubing, if necessary) are cut square and flush with the end of the tubing adjacent the ends of the fibers; (b) A heated tool, e.g., a soldering iron, having a predetermined appropriate temperature, is applied to the ends of the fibers to fuse the fiber ends together causing the outer portion of the fused ends to shrink back (at 16), and expand (at 18) to fill the tubing resulting in a joint within the tubing shaped as shown in FIG. 3.

While the connection of FIG. 3 may be used in the form shown with sensors or probes, for other uses or applications, the following additional steps are preferably performed:

(1) Cutting the tubing and fused fiber ends square;

(2) Pushing the joint out of the tubing a short distance;

(3) Coating the joint with ultraviolet (UV)-curing optical cement, preferably in liquid form;

(4) Pulling the coated fiber joint back into the tubing so that the optical cement fills the space inside the tubing for a small distance behind (to the right as seen in FIG. 4) and in front of the fiber joint. The distances over which the cement fill extends is controlled by the amount of cement added to the joint before and after pulling the joint back into the tubing. Care exercised in performing this step will result in the avoidance of bubbles which can scatter light. Moreover, due to the non-wettability of the PTFE, the cement 20 forms a flat surface at the end of its forward extent, as seen at 22 in FIG. 4;

(5) Curing the cement with ultraviolet (UV) light; and (6) Withdrawing the fused fiber connection from the PTFE tubing to produce a finished dual fiber side-by-side joint (FIG. 5).

The finished joint of plastic optical fibers shown in FIG. 5 is then ready for use in constructing a dual, or dual-to-single, fiber sensor.

Variations of the method described above facilitate the joining or connection of fibers end-to-end in order to make a connection between fibers of different size or to produce a bifurcated fiber.

To join two single fibers of different diameter, the ends 30, 32 of both fibers are heat-flared using a hot object, as for example, a soldering iron, in order to expand the ends to approximately the same diameter. It is preferable to heat-expand the fiber ends inside PTFE tubing of an appropriate, preselected diameter so that both ends attain substantially the same diameter or flare width. The fiber ends are then cut square as described earlier (p.51.28). The ends are then inserted into the same or another short length of PTFE tubing 34 of inside diameter close to the diameter or flare width of the fiber ends, and the empty space inside the tubing is filled with UV-curing optical cement 36. This may alternatively be accomplished by inserting one fiber end in one end of the tube, filling the tubing with cement and then inserting the second fiber end into the opposite end of the tube. FIG. 6 illustrates the resultant connection after the cement has been cured by UV exposure. The finished joint is preferably left inside the tubing for added strength.

To make bifurcated fibers, the steps set out above for the end-to-end connection are employed using as the first fiber a dual fiber joint (as previously described) and as the second fiber a single optical fiber. The same heat-flaring process is employed to expand the ends of the first and second fibers to approximately the same diameter or flare width, and the ends of the two fibers are then inserted into a short length of PTFE tubing with an appropriate filling or UV-curing optical cement. After the cement has been cured by exposure to UV-radiation, the finished joint (shown in FIG. 7) may be left inside the tubing for added strength.

Fibers of various diameter may be used in making these joints and connections. Fibers having diameter of 0.010 inch to 0.050 inch have been used with good performance and little or substantially no light loss at the joints.

Yet another variation of these methods is possible to make connectors for optical fibers using single or multiple ends which are not joined but left terminated and surrounded by the cured optical cement and tubing (of plastic or metal). This construction serves as one half of a connector. Two such connectors can then be joined, and if desired, optically coupled with an index-matching liquid.

It will be obvious to those skilled in the art that various changes may be made without departing from the scope of the invention, and the invention is to be considered limited to what is shown in the drawings and described in the specification.

I claim as my invention:

1. A method of making a plastic optical fiber connection, comprising:

providing non-wettable first tubular means, and first and second optical fibers;

placing one end of each of said first and second fibers in said tubular means;

heating the ends of the fibers within said tubular means to cause said fibers to expand and fill the inside diameter of said tubular means, and, when said fiber ends have been placed in said tubular means in a side-by-side relationship, fusing said fiber ends;

causing the expanded end of said first optical fiber to be within a tubular sleeve so that a space remains within said tubular means;

filling the space remaining within said tubular sleeve with ultraviolet-curing optical cement;

contacting, within said tubular expanded end of said sleeve, said second fiber with said optical cement; and curing said cement.

2. The method of claim 1, wherein said step of placing comprises inserting said fiber ends in the same end of said tubular means in side-by-side relationship, whereby said connection is a dual-fiber connection which may be used to construct a dual-fiber sensor.

3. The method of claim 2 wherein said step of fusing comprises heat-expanding said fiber ends by applying heat.

4. The method of claim 2 wherein said step of curing comprises exposing said tubular means and inserted fiber ends to ultraviolet light.

5. The method of claim 2, and further comprising the steps of removing said first tubular means, providing second tubular means having a predetermined internal diameter, inserting said dual-fiber connection in one end of said second tubular means, providing a third optical fiber, inserting one end of said third optical fiber in the opposite end of said second tubular means, heating the ends of said fibers within said second tubular means expanding said ends to substantially said internal diameter, filling the remaining space within said second tubular means with ultraviolet-curing optical cement, and curing said cement.

6. The method of claim 1, wherein said step of placing comprises inserting said fiber ends in opposite ends of said tubular means in end-to-end relationship.

7. The method of claim 6, wherein at least one of said first or second fibers comprises two optical fibers fused in side-by-side parallel relationship.

8. The method of claim 1, wherein at least one of said first or second fibers comprises two optical fibers fused in side-by-side parallel relationship.

9. A connection between plastic optical fibers made in accordance with the method of claim 1.

10. A connection between plastic optical fibers made in accordance with the method of claim 2.

11. A connection between plastic optical fibers made in accordance with the method of claim 3.

12. A connection between plastic optical fibers made in accordance with the method of claim 4.

13. A connection between plastic optical fibers made in accordance with the method of claim 5.

14. A connection between plastic optical fibers made in accordance with the method of claim 6.

15. A connection between plastic optical fibers made in accordance with the method of claim 7.

16. A connection between plastic optical fibers made in accordance with the method of claim 8.

* * * * *